Patented Aug. 25, 1925.

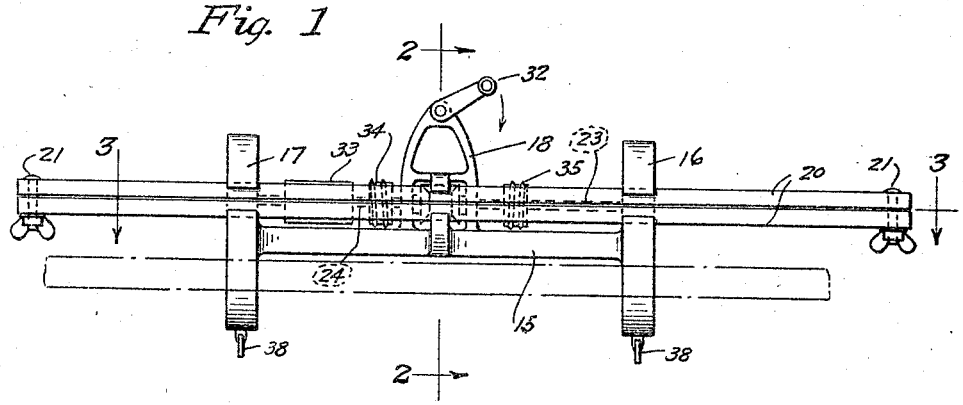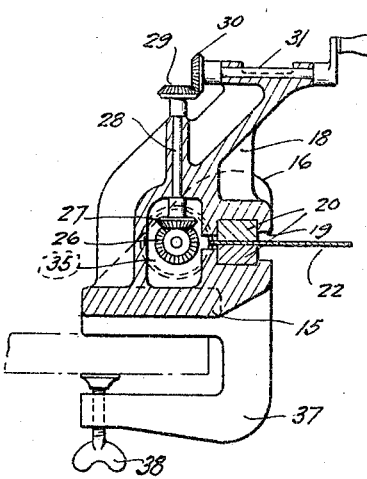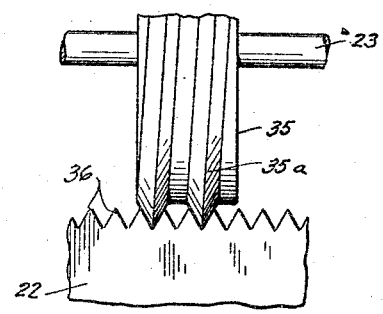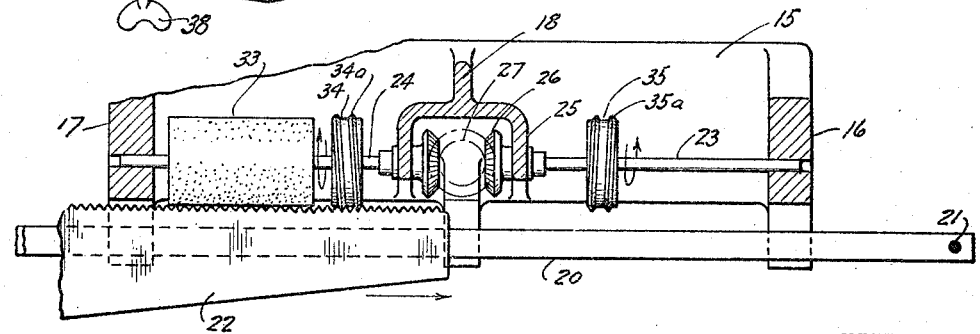

1,550,913

UNITED STATES PATENT OFFICE.

CHARLES S. MARSH, OF LOS ANGELES, CALIFORNIA.

SAW-SHARPENING MACHINE.

Application filed November 13, 1923. Serial No. 674,562.

*To all whom it may concern:*

Be it known that I, CHARLES S. MARSH, a citizen of the United States, and a resident of Los Angeles, in the county of Los Angeles and State of California, have invented certain new and useful Improvements in Saw-Sharpening Machines, of which the following is a specification.

My invention relates to saw sharpening machines, and a purpose of my invention is the provision of a machine which, in addition to having the desirable qualities of simplicity, durability, and efficiency, includes abrasive means which operates not only to sharpen the teeth of a saw but which also operates to automatically feed the saw through the machine during the sharpening operation.

It is also a purpose of my invention to provide a saw sharpening machine in which a jointer is adapted for operation simultaneously with the abrasive elements, and a machine having a plurality of abrasive elements having spirally arranged grinding edges which continuously move between the teeth of a saw to sharpen the saw and simultaneously feed the same through the machine.

I will describe one form of saw sharpening machine embodying my invention and will then point out the novel features thereof in claims.

In the accompanying drawings:

Figure 1 is a view showing in side elevation one form of saw sharpening machine embodying my invention;

Fig. 2 is a vertical sectional view taken on the line 2—2 of Fig. 1;

Fig. 3 is a longitudinal sectional view taken on the line 3—3 of Fig. 1; and

Fig. 4 is an enlarged fragmentary view of one of the abrasive elements embodied in the machine shown in the preceding views.

Referring specifically to the drawings, in which similar reference characters refer to similar parts, my invention in its present embodiment comprises a frame including a base 15, terminal standards 16 and 17 and an intermediate standard 18 equally spaced from the standards 16 and 17, and all supported upon the base 15. As illustrated to advantage in Figs. 2 and 3, the three standards are formed with longitudinal alined slots 19 which are formed to accommodate clamping bars 20 for longitudinal sliding movement, such bars being connected at their ends by fastening members 21 (Fig. 1) and adapted to receive therebetween the blade 22 of a saw.

For securing the machine to a table or other suitable support, the standards 16 and 17 are formed with depending brackets 37 having clamping screws 38 which can be adjusted to clamp the standards to the support.

As clearly shown in Figure 3, a pair of longitudinally alined shafts 23 and 24 are arranged with their outer ends journaled in standards 16 and 17, and their inner ends journaled in bearings 25 supported on the intermediate standard 18. The confronting ends of the shafts are provided with level gears 26 which constantly mesh with a similar gear 27 fixed to the lower end of a vertically disposed shaft 28 journaled in the standard 18. The upper end of the shaft 18 is provided with a bevel gear 29 which meshes with a similar gear 30 fixed to a shaft 31 journaled upon the standard 18 and arranged at right angles to the shaft 28. The outer end of the shaft 31 is provided with a crank 32 by means of which the shaft can be manually rotated to effect operation of the shaft 28 whereby the shafts 23 and 24 may be rotated in opposite directions.

Fixed to the shaft 24 is a jointer 33 and an abrasive or grinding element 34, the latter being arranged at the inner end of the jointer, as clearly shown in Figure 3. Fixed to the shaft 23 is another abrasive element 35, the elements 34 and 35 comprising a cylindrical body having thereon spirally arranged projections $34^a$ and $35^a$, respectively, formed of suitable abrasive material. The construction of either abrasive element 34 or 35 is clearly illustrated in Figure 4, wherein it will be noted that the spiral edges are oppositely beveled from a central line so as to conform to the V-shaped contour of the spaces between the teeth 36 of the blade 22.

In operation, the saw blade is secured between the clamping bars 20 and in such manner that the points of the teeth 36 contact with the periphery of the jointer 33, while certain of the teeth are engaged by the grinding edges $34^a$ of the abrasive element 34. With the saw in this position it will be clear that when the shafts 23 and 24 are operated by rotation of the crank 32, the jointer 33 and the abrasive elements 34 and 35 will be rotated. During rotation of the element 34 the spiral edges 34ª engage the teeth 36 of the saw and thus move the saw to the right to the position shown in Fig. 1, it being remembered that the clamping bars 20 are mounted for sliding movement within the slots 19. As the saw is fed forwardly, the teeth thereof are brought first into engagement with the jointer 33 where the points of the saw teeth are alined. After passing from the jointer the teeth are then engaged by the element 34, with the bevelled surfaces of the edges 34ª engaging the side edges of the saw teeth and thereby sharpening the latter. It is to be noted that the convolutions of the spiral edge 34ª are spaced to engage alternate teeth only. Upon continued operation of the machine, the saw is fed from the element 34 into engagement with the spiral edge 35ª of the element 35, where those alternate teeth of the saw not engaged by the element 34 are engaged to complete the sharpening operation.

The purpose of having two abrasive elements which engage alternate teeth is so that, in practice, the element 34 will sharpen only those saw teeth set to one side of the blade, while the element 35 will sharpen the teeth set to the other side of the blade.

Although I have herein shown and described only one form of saw sharpening machine embodying my invention, it is to be understood that various changes and modifications may be made therein without departing from the spirit of the invention and the spirit and scope of the appended claims.

What I claim is:

1. A saw sharpening machine comprising a frame, saw clamping bars slidable in the frame, a pair of alined shafts journaled in the frame, a jointer fixed to one of the shafts, abrasive elements fixed to both of the shafts, said elements being of spiral form, the form of one element being reversed to that of the other, and means for rotating the shafts in opposite directions.

2. A saw sharpening machine comprising a frame, a pair of alined shafts journaled in the frame, abrasive elements fixed to the shafts, a saw clamp slidably mounted in the frame and adapted to support a saw blade in such manner that its teeth can be engaged by the abrasive elements, and means for rotating said shafts whereby said abrasive elements are rotated while in engagement with the saw teeth to sharpen the same and simultaneously feed the saw and clamp in the frame so that the abrasive elements will successively engage the saw teeth throughout the length of the saw.

3. A saw sharpening machine comprising means for supporting a saw for longitudinal movement, means for jointing the teeth of said saw, and means for sharpening the saw teeth, which is operable to continuously move the saw and thus cause the teeth thereof to successively engage the jointer and sharpening means.

4. A saw sharpening machine comprising means for supporting a saw for longitudinal movement, means for jointing the teeth of said saw, and rotary sharpening elements of spiral form, which are operable to continuously move the saw and thus cause the teeth thereof to successively engage the jointer and sharpening elements.

5. A saw sharpening machine comprising means for supporting a saw for longitudinal movement, means for jointing the teeth of said saw, and a plurality of means for sharpening the saw teeth, said means being operable to continuously move the saw and thus cause the teeth thereof to successively engage first the jointer and then said sharpening means.

6. A saw sharpening machine comprising means for supporting a saw for longitudinal movement, means for jointing the teeth of said saw, and a plurality of rotary abrasive elements of spiral form for sharpening the saw teeth, said means being operable to continuously move the saw and thus cause the teeth thereof to successively engage first the jointer and then said sharpening means.

7. A saw sharpening machine comprising means for supporting a saw for movement, and a plurality of abrasive elements of spiral form mounted for rotation in opposite directions and operating to continuously move the saw and thus cause the teeth thereof to successively engage the abrasive elements.

8. A saw sharpening machine comprising means for supporting a saw for movement, means for jointing the teeth of said saw, and a plurality of abrasive elements mounted for rotary movement and adapted to engage the teeth of the saw for sharpening the teeth thereof and feeding the saw on said means, said elements having spiral grinding edges, with the edge of one element engaging alternate teeth of the saw, while the edge of the other element engages the remaining teeth.

9. A saw sharpening machine, comprising means for supporting a saw for movement, saw sharpening means operable to move the saw, and means for jointing the teeth of the saw as it is moved.

CHARLES S. MARSH.